United States Patent [19]

Gonzalez

[11] Patent Number: 4,731,854
[45] Date of Patent: Mar. 15, 1988

[54] OPTICAL SYSTEM FOR PRODUCING AN IMAGE FOR A SET OF CHARACTERS

[75] Inventor: Rafael C. Gonzalez, Knoxville, Tenn.

[73] Assignee: Perceptics Corporation, Knoxville, Tenn.

[21] Appl. No.: 887,545

[22] Filed: Jul. 17, 1986

[51] Int. Cl.$^4$ .............................................. G06K 9/00
[52] U.S. Cl. ......................................... 382/1; 358/93; 382/65
[58] Field of Search ....................... 350/394, 403, 407; 358/101, 108, 244, 225, 93; 354/129, 130, 135, 150; 382/1, 65

[56] References Cited

U.S. PATENT DOCUMENTS

| | | | |
|---|---|---|---|
| 3,502,888 | 3/1970 | Stites | 250/219 |
| 3,543,007 | 11/1970 | Brinker et al. | 235/61.11 |
| 3,690,233 | 9/1972 | Billingsley | 354/129 |
| 3,801,182 | 4/1974 | Jones | 350/156 |
| 3,890,628 | 6/1975 | Gurtler | 354/227 |
| 4,018,519 | 4/1977 | Clapp | 352/89 |
| 4,380,026 | 4/1983 | Kubota | 358/106 |
| 4,469,442 | 9/1984 | Reich | 356/364 |
| 4,491,923 | 1/1985 | Look | 364/478 |
| 4,603,390 | 7/1986 | Mehdipour et al. | 364/467 |

*Primary Examiner*—Leo H. Boudreau
*Attorney, Agent, or Firm*—Luedeka, Hodges & Neely

[57] ABSTRACT

An optical system produces an image of a set of characters on a background. A flash light source directs uniform illumination toward the set of characters for a predetermined flash period having an intensity chosen to exceed the intensity of corrupting light from the environment, such as sun light, street lights or car lights. A first polarizer is positioned to polarize the illumination from the flash light source prior to the light impinging on the set of characters, and a second polarizer is positioned to receive light reflected by the set of characters and the background. The second polarizer is cross-polarized with respect to the first polarizer so that it filters out polarized light from the flash light source that is reflected by the set of characters and background. An optical receiver is positioned to receive light from the second polarizer and produces an image of the set of characters and the background. A shutter is used to control the light received by the optical receiver. The shutter is synchronized with the flash light source and the optical receiver to open and close during the flash so that the image produced by the optical receiver is dominantly produced by the de-polarized flash light reflected from the set of characters and background.

8 Claims, 1 Drawing Figure

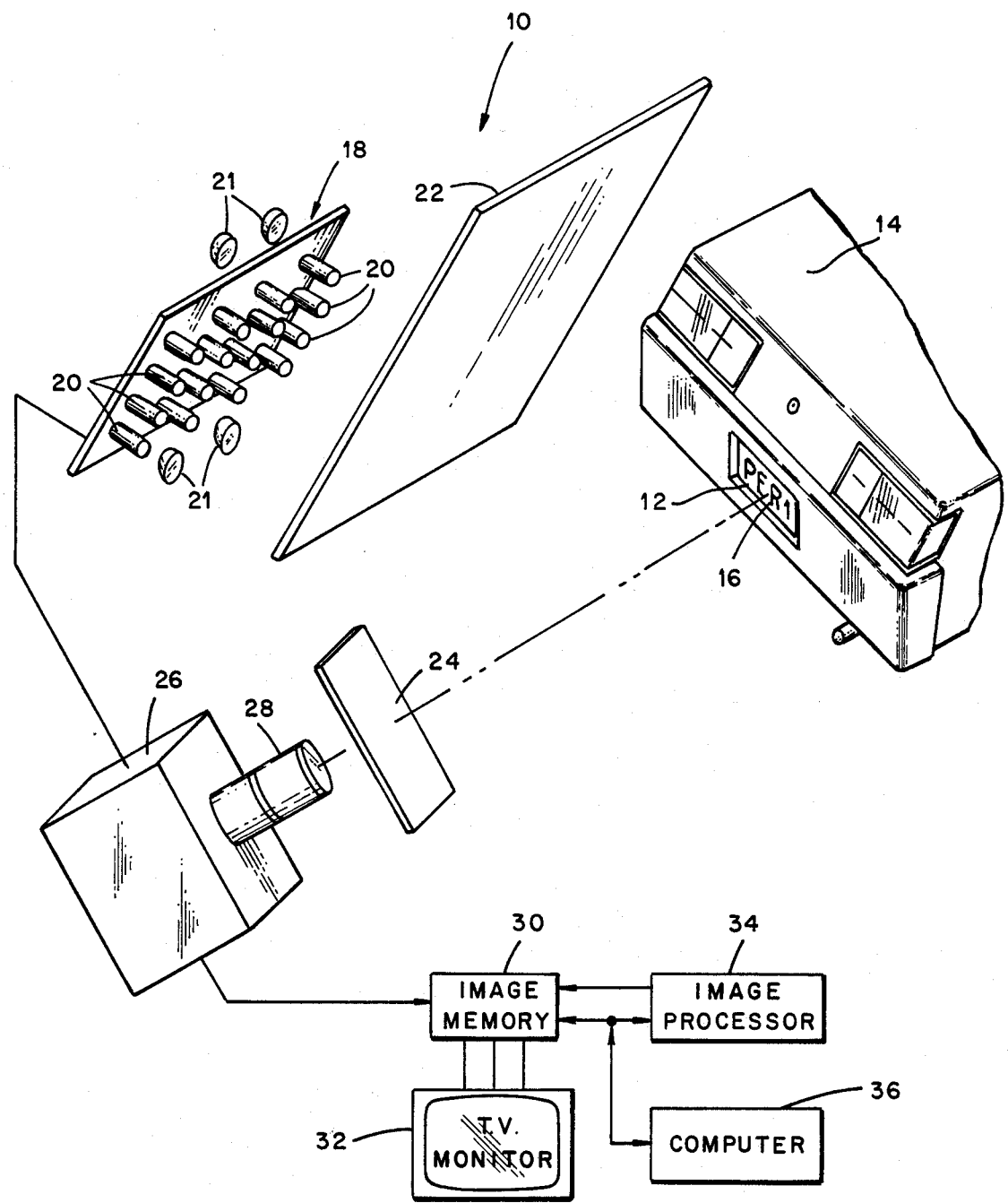

OPTICAL SYSTEM FOR PRODUCING AN IMAGE FOR A SET OF CHARACTERS

FIELD OF INVENTION

The present invention relates to optical systems for imaging a set of characters on a background and particularly relates to an optical system for producing an image of a license plate in the presence of corrupting ambient light.

BACKGROUND

One object of this invention is to produce an accurate image of a license plate while it is carried on a vehicle. License plates are normally illuminated for viewing by the sun, street lights, car lights and other light sources, and the vehicle carrying the plate is usually required by law to have lights that illuminate the plate at night. For human viewing and for many applications, this type of illumination is more than sufficient. However, it has been discovered that, in order to accurately produce an image of the license plate for more exacting applications such as image processing and/or recognition by computer, the normal ambient illumination should be considered as corrupting light. In other words, the normal illumination reflected by the license plate is usually considered to be a source of information, but it should be regarded as a source of noise.

Corrupting light (normal illumination) often impinges upon the license plate at an acute angle and will create shadows. For example, when the sun is overhead, the angle of incidence of sun light on the license plate is usually acute and if the license plate is recessed in the vehicle, a shadow from the car may be formed across the license plate. In some cases, the edge of the shadow may be in the center of the license plate. In such case, the license plate will include two areas that are receiving very different levels of light intensity. It is difficult to correct an image to compensate for these two different intensity levels and, of course, other sources of corrupting light may create similar shadows which add to the complexity of the shadow problem.

Many license plates are embossed and the embossing may also cause problems in the imaging process. When the characters of a license plate are embossed or raised, corrupting light may create shadows of the characters themselves on the license plate. Part of one character may fall in the shadow of the same character, or one character may shadow another character. In any event, the presence of shadows on the license plate make it difficult to accurately image the characters of the license plate. Also, the embossing creates numerous convex and concave surfaces on the license plate that will result in areas of high intensity and low intensity in terms of surface reflected light. Finally, the reflective properties of the vehicle on which the license plate is mounted will often create problems for imaging the license plate. For example, there may be areas of glare or high light intensity on the vehicle itself which will interfere with the equipment used to image the license plate.

The problems associated with imaging license plates have been recognized and are solved by the present invention in which normal illumination is treated as noise and is overcome. In one embodiment thereof, an optical system for producing an image of a set of characters on a background, such as a license plate, includes a flash light source for directing light toward the set of characters for a predetermined flash time period. A first polarizer is used to polarize the light from the flash light source and only the polarized light is transmitted to impinge upon the set of characters. The intensity of the illumination from the first polarizer exceeds the intensity of corrupting light from the environment of the license plate during the flash time period. A second polarizer is positioned to receive light that emanates from the set of characters and background, and the second polarizer is cross-polarized with respect to the first polarizer. In this configuration, the second polarizer is operable to filter out polarized light from the first polarizer that is specularly reflected by the set of characters and the background. Light from the first polarizer that is reflected and de-polarized by the set of characters and the background is partially transmitted through the second polarizer. An optical receiver is positioned behind the second polarizer and receives light from the set of characters and the background. This optical receiver produces an image of the set of characters and the background, and a shutter is provided to control the light that strikes the optical receiver. The shutter is synchronized with the optical receiver and flash light source so that it opens and closes during the flash period to admit light into the optical receiver. In this manner, the image produced by the optical receiver is dominantly produced by de-polarized flash light that is reflected by the set of characters and the background and is transmitted through the second polarizer and through the shutter into the optical receiver. In the preferred system, the second polarizer and shutter are the same device, a Kerr cell. However this is not necessary for the technique to work.

Since the shutter speed is open for a time that is less than or equal to the duration of the flash, and since the illumination from the flash source has an intensity greatly exceeding the intensity of the corrupting light and is synchronized with the opening of the shutter, the image produced by the optical receiver is dominantly from the light produced by the flash light source. In the preferred embodiment, the flash light source is one or more Xenon gas discharge type flashes. Also, the system may also include a constant source of light. The function of this constant light source is to mask the flash so that it will not be as noticeable.

Finally, in addition to synchronizing the shutter with the flash, the optical receiver is synchronized with either the flash or the shutter. In the preferred form, the optical receiver is a video camera that is synchronized to begin absorbing received light just prior to the opening of the shutter.

BRIEF DESCRIPTION OF THE DRAWINGS

The present invention may best be understood by reference to the following detailed description of a preferred embodiment when considered in conjunction with the drawings in which:

FIG. 1 is a schematic diagram of an optical system in which a license plate is illuminated by polarized light and is imaged by a television camera viewing the license plate through a cross-polarized filter.

DETAILED DESCRIPTION

Referring now to FIG. 1 there is shown an optical system 10 embodying one form of the present invention. The function of the optical system 10 is to produce a clear image of a license plate 12 which is carried on a vehicle 14. During daylight hours, there is generally adequate light from the sun to illuminate the license plate 12 for easy visual perception. However, the human eye is very adept at compensating for imperfect lighting conditions. It has been determined that for the purpose of producing an accurate image of a license plate 12 carried on a vehicle 14, sun light and other normal light sources should be considered corrupting light. That is, sunlight is not a source of imaging information, rather it is noise. In order to overcome the corrupting ambient light, it has been determined that a brilliant flash of a very short duration should be used to illuminate the license plate 12 and that the image should be taken during the brief time period in which the brilliant flash is illuminating the license plate 12. The sun provides a relatively strong constant light source, but by limiting the duration of the flash and the duration over which the image is taken, the noise effect of sunlight can be minimized or reduced to acceptable levels.

In order to illuminate the license plate 12, the present invention utilizes a flash 18. The flash 18 must provide uniform illumination for the license plate 12. Although many types of conventional flash units may be used, the preferred flash unit 20 is a Xenon gas discharge strobe. The illumination from the flash 18 is directed toward a polarizer 22 which is preferably a polarized screen manufactured by Polaroid, Type HN42, Model No. 605227. As the illumination from the flash 18 passes through the polarizer 22, it is polarized in a first sense and impinges upon a rear of the vehicle 14 and thus, illuminates the license plate 12. In some applications it may be desirable to mask the presence of the flash 20 so that motorists would be less likely to notice the flash. For such masking purposes, one or more constant light sources 21, are used to provide a constant source of illumination and a mask for the flash 20. Of course, this constant source of illumination is not necessary and may be eliminated in applications where it is not desired. In one embodiment of the invention, the distance between the camera 26 and the plate 12 is about 13.5 feet, and the distance between the flash 18 and the plate 12 also is about 13.5 feet. The output of the flash 18 is about 800 watt-seconds which is sufficient to overwhelm other normal light sources, such as the sun, during the flash. The polarized light that strikes the rear of the vehicle 14 is reflected in both a polarized and non-polarized form. The rear of the vehicle 14 and the license plate 12 itself will have some surfaces that have a mirror-like finish. The polarized light that strikes these mirror-like finishes will be specularly reflected with substantially the same polarization as the incident light. However, most of the surface area of the license plate 12 and the vehicle 14 provide nonspecular surfaces that primarily diffuse the incident light so that the light reflected therefrom is largely lambertian and of random polarization. The mirror-like finishes on the license plate 12 may be thought of as hot spots and the polarized light that is reflected therefrom does not carry useful information. The characters 16 provide a diffuse reflection of light that is non-polarized. Thus, a second polarizer 24, is used to reject the polarized light that is specularly reflected from the vehicle 14 and license plate 12. The polarizer 24 is cross-polarized with respect to the polarizer 22 so that it does, in fact, reject light that remains polarized after it is reflected. The lambertian light that is reflected from the license plate 12 and vehicle 14 has a substantial component that is polarized in a sense that will be transmitted through the polarizer 24, and at least 10% of this non-polarized reflected light will be transmitted through the polarizer 24 toward a television camera 26. The television camera 26 is a Model SX-102, manufactured by Video Masters, Inc., and a Kerr cell performs as both the second polarizer 24 and the camera shutter 28. The Kerr cell is manufactured by Motorola, Model A20CE20 BA. It is synchronized with both the light integration within a television camera 26 and the flash 18.

That portion of the camera 26 designated herein as shutter 28 also includes a filter that excludes ultraviolet and infrared light. Preferaby a HOYA model CM500 is incorporated into filter 28 which alternates radiant energy at wave lengths shorter than 320 nm and longer than 680 nm but shorter than 1200 nm.

When the vehicle 14 is within the viewing angle of the television camera 26, a trigger signal is given to the camera 26 to produce an image of the license plate 12 and the vehicle 14. This trigger signal may be generated manually or automatically. The repeatability of the vehicle position when the trigger signal is generated is important to ensure that a license plate will always occupy approximately the same portion of the video frame.

When the camera 26 is triggered, it will clear the image stored in the camera and will begin integrating light to form a new image. Immediately after integration of the new image begins, a signal is transmitted to the flash 18 causing it to produce a flash. After the flash has begun, a signal will cause the shutter 28 to open and close during the flash illumination from the flash 18, and the light from the flash 18 will have a greater duration than the shutter opening time. In this manner, an image is captured within the television camera 26 and as the image is scanned, it is converted to digital form and stored in the image memory 30. Although a number of different image memories may be used, it is preferred to use one manufactured by Perceptics Corporation, embodied in the Perceptics Model 920 image processor.

The image stored in the memory 30 has a signal to noise ratio on the order of 31 db and is, thus, substantially free from the influences of corrupting light. That is, the image is substantially free from shadow effects and hot spots. And, thus, has a sufficiently high quality to provide accurate monitoring or further processing. The image in memory 30 may be displayed on a television monitor 32, or it may undergo further processing in an image processor 34 such as a Perceptics Model 920 processor. Using the image processor 34 the image may be enhanced using known enhancement techniques and returned to the image memory 30 for display on the television monitor 32. Also, either before or after processing in the image processor 34, the data may be transmitted to a computer 36 for further storage or analysis.

The key to the successful operation of the optical system 10 in imaging a license plate 12 is the recognition that sunlight incident upon the license plate 12 is not a source of information but, rather, it is a source of noise. In order to overcome this noise, a flash unit is used to provide a uniform illumination for the vehicle 14 and license plate 12. A second key to the successful operation of the optical system 10 is the recognition that bright spots or hot spots on the vehicle 14 and license plate 12 are not sources of information and they too are sources of noise to be overcome. To overcome this noise, it is first recognized that the hot spots constitute specularly reflected light. In view of this, the third key to the successful operation of the optical system 10 is the use of the polarizers 22 and 24 which are positioned in a cross-polarized fashion. By illuminating the rear of the vehicle 14 and the license plate 12 with polarized light and by using a second polarizer 24 to reject light that is specularly reflected from the plate 12 and vehicle 14, one rejects the noise imposed by specular reflection. By recognizing these special problems associated with imaging license plates and solving them by the combination of elements described above, a very useful image of the license plate 12 is produced for further processing and monitoring.

Although a particular embodiment has been described above, it is will be understood that the invention is capable of numerous rearrangements, modifications and substitutions of parts without departing from the scope of the invention. In particular, it is noted that different types of polarizers 22 and 24 may be used including rotational polarizers and different types of flash light sources could be used. While it is much preferred to use an array of flash units to produce the flash illumination, it is understood that a single flash source would also provide a usable flash illumination.

What is claimed is:

1. An optical system for producing an image of a set of characters on a background in the presence of corrupting light, comprising:
    a flash light source for directing light toward the set of characters for a predetermined flash time period;
    a first polarizer for polarizing the illumination of said flash light source prior to the light impinging upon the set of characters, the illumination from said first polarizer impinging upon the set of characters having an intensity exceeding the intensity of the corrupting ambient light;
    a second polarizer positioned to receive light reflected from said set of characters and background, said second polarizer being cross-polarized with respect to said first polarizer whereby said second polarizer is operable to filter out polarized light from said first polarizer that is specularly reflected by said set of characters and background;
    an optical receiver for receiving light from said second polarizer and producing an image of said set of characters and said background; and
    a shutter synchronized with said flash light source and optical receiver to open and close during said flash time period to admit light into said optical receiver, whereby the image produced by said optical receiver is dominantly produced by de-polarized light reflected by said set of characters and background from said flash light source.

2. An optical license plate imaging system for producing an image of a license plate on a vehicle in the presence of corrupting light in the environment, said license plate bearing a set of characters comprising:
    a flash light source for directing light toward the license plate for a predetermined flash time period;
    a first polarizer positioned between said flash light source and the license plate for polarizing the light from said flash light source the light from said first polarizer incident upon the license plate having an intensity exceeding the intensity of the corrupting ambient light;
    a second polarizer positioned to receive light reflected from said license plate, said second polarizer being cross-polarized with respect to said first polarizer whereby said second polarizer is operable to filter out polarized light from said first polarizer that is specularly reflected in a polarized state by said license plate;
    an optical receiver for receiving light from said second polarizer and producing an image of said license plate; and
    a shutter synchronized with said optical receiver and flash light source to open and close at a selected shutter speed during said predetermined flash time period to admit light into said optical receiver, whereby the image produced by said optical receiver is dominated by light from said flash light source that is de-polarized when reflected by said license plate.

3. The system of claim 2 wherein said flash light source comprises a plurality of flash light units that simultaneously flash to produce a uniform flash.

4. The optical system of claim 2 wherein said shutter speed is within the range of $10^{-6}$ to $4\times 10^{-3}$ seconds.

5. The optical system of claim 2 wherein said shutter speed is about one ten-thousandth of a second.

6. The optical system of claim 2 wherein said shutter comprises an electronic liquid crystal shutter.

7. The optical system of claim 2 further comprising a continuous light source for masking the flash illumination from said flash light source.

8. The optical system of claim 2 wherein said optical receiver comprises a television camera that is synchronized with said shutter and said flash unit to begin integrating light to form an image immediately prior to the opening of the shutter.

* * * * *